(12) United States Patent
Levy

(10) Patent No.: US 10,970,290 B1
(45) Date of Patent: Apr. 6, 2021

(54) MACHINE LEARNING OF RESPONSE SELECTION TO STRUCTURED DATA INPUT

(71) Applicant: OJO Labs, Inc., Austin, TX (US)

(72) Inventor: Joshua Howard Levy, Austin, TX (US)

(73) Assignee: OJO LABS, INC., Austin, TX (US)

(*) Notice: Subject to any disclaimer, the term of this patent is extended or adjusted under 35 U.S.C. 154(b) by 196 days.

(21) Appl. No.: 15/992,851

(22) Filed: May 30, 2018

Related U.S. Application Data

(63) Continuation of application No. 15/897,885, filed on Feb. 15, 2018, now Pat. No. 10,019,491, which is a continuation-in-part of application No. 15/826,151, filed on Nov. 29, 2017, now Pat. No. 10,013,654.

(51) Int. Cl.
| | |
|---|---|
| *G06F 16/2457* | (2019.01) |
| *G06F 17/11* | (2006.01) |
| *G06N 20/00* | (2019.01) |
| *G06F 40/20* | (2020.01) |
| *G06F 40/186* | (2020.01) |

(52) U.S. Cl.
CPC ........ *G06F 16/24578* (2019.01); *G06F 17/11* (2013.01); *G06F 40/186* (2020.01); *G06F 40/20* (2020.01); *G06N 20/00* (2019.01)

(58) Field of Classification Search
CPC .................................................. G06F 17/3053
USPC ........................................... 706/12; 704/257
See application file for complete search history.

(56) References Cited

U.S. PATENT DOCUMENTS

| | | |
|---|---|---|
| 2009/0307159 A1 | 12/2009 | Pinckney et al. |
| 2013/0226846 A1 | 8/2013 | Li et al. |
| 2014/0006012 A1 | 1/2014 | Zhou et al. |
| 2017/0161320 A1 | 6/2017 | Venkataraman et al. |

OTHER PUBLICATIONS

Notice of Allowance, dated Apr. 20, 2018, U.S. Appl. No. 15/897,885, pp. 1-8.
International Search Report and Written Opinion dated Jan. 23, 2019, mailed in International Patent Application No. PCT/US2018/060188, pp. 1-11.
Examination Report of Australian patent application 2018374736 of corresponding U.S. Appl. No. 15/992,851, dated Jun. 17, 2020, pp. 1-4, Australian Government IP Australia.

*Primary Examiner* — Stanley K. Hill
(74) *Attorney, Agent, or Firm* — Kent B. Chambers; Terrile, Cannatti & Chambers, LLP

(57) ABSTRACT

A machine learning of response selection to structured data input enables a machine to flexibly and responsively actively engage with a response recipient through a device, such as any electronic device connected to a data network. In at least one embodiment, the response selection module improves response selection to the structure data input by initially filtering a library of templates to identify candidate templates that best respond to the input. In at least one embodiment, the response selection module ranks the identified candidate templates to provide the response to the device. The response selection module learns by receiving feedback, such as a linked recipient action result signal.

24 Claims, 14 Drawing Sheets

Response Prediction Input Data 400

```
"incoming message":
  "id": "6985db4c-086b-4d64-a8a6-4e97ffa9acfa",
  "body": "How many bedrooms on the first floor?",     404
  "receivedAt": 1496457003129,
  "customerId": "48dd3452-397b-46d8-989e-db9350e19133",
  "isSpam": false
```

```
                                                       CONTEXTUAL DATA
"customer":                                                      406
  "data":
    "agent":
      "phoneNumber": "+15125550000"

"facts":
      "Mls Constraint":
        "tx_actris"

"Listing Status Constraint":
        "Active"

"id": "48dd3452-397b-46d8-989e-db9350e19133",
  "phoneNumber": "+15125551234"

"conversation":
  "messages":

"message":
          "id": "0a57cb21-4929-4a1c-b783-9f24aab25b60",
          "incoming": true,
          "body": "How many bedrooms are there at 61204
Mesa?",
          "receivedAt": 1487093713,
          "customerId": "48dd3452-397b-46d8-989e-
db9350e19133",                                              402
          "domain"
              "property"
              "intents": "property details", "rooms", "bedrooms"
"room", "count",
              "entities":
                  "listing":
                    "value": "tx_actris_1234567",
                    "ending_char": 40,
                    "starting_char": 31,
                    "string": "61204 Mesa"
```

*FIG. 4*

Response Prediction Input Data 400 (cont'd)

CONTEXTUAL DATA 406

```
"fulfillment":

"answer": 3,
    "status_code": "ok",
    "path": "property details", "rooms", "bedrooms", "room",
"count",
    "normalized_entities":                              408
        "listing":
            "value": "tx_actris_1234567",
            "ending_char": 40,
            "starting_char": 31,
            "string": "61204 Mesa"

"which":
            "ending_char": 37,
            "starting_char": 26,
            "string": "first floor",
            "value": "first floor"
```

*FIG. 5*

| "id" | "intent_path" | "status_code" | "content" | "is_multi_answer" | "context" | "requirements" |
|---|---|---|---|---|---|---|
| 1 | "Property Details/Rooms/ Bedroom/Room /Count" | "ok" | "The home at {{{message.fulfillment.no rmalized_entities.Listing. string}}} has {{#message.fulfillment.a nswer}}{{{value}}} bedroom{{#is_plural}}s{ {/is_plural}}{{/message.f ulfillment.answer}}." | FALSE | "{""required_ entity_names" "": [""Listing""] }" | "{""required_entity_values""": {}}" |
| 2 | "Property Details/Rooms/ Bedroom/Room /Count" | "ok" | "There are {{#message.fulfillment.a nswer}}{{#is_plural}} }{{/is_plural}}{{^is_plural} }s{{/is_plural}} {{{value}}} {{/value}} bedroom{{#is_plural}}s{ {/is_plural}}{{/message.f ulfillment.answer}} in the home at {{{message.fulfillment.no rmalized_entities.Listing. string}}}." | FALSE | "{""required_ entity_names" "": [""Listing""] }" | "{""required_entity_values""": {}}" |
| 3 | "Property Details/Rooms/ Bedroom/Room /Count" | "ok" | "This home has {{#message.fulfillment.a nswer}}{{{value}}} }{{/is_plural}}s{ {/is_plural}} bedroom{{#is_plural}}s{ {/is_plural}}{{/message.f ulfillment.answer}}." | FALSE | "{""required_ entity_names" "": [""Listing""] }" | "{""required_entity_values""": {}}" |

*FIG. 7*

| "id" | "intent_path" | "status_code" | "content" | "is_multi_answer" | "context" | "requirements" |
|---|---|---|---|---|---|---|
| 4 | "Property Details/Rooms/ Bedroom/Room /Count" | "ok" | "I see that {{{message.fulfillment.no rmalized_entities.Listing. string}}} has {{{message.fulfillment.a nswer}}}{{{(value)}}} bedroom{{#is_plural}}s{ {/is_plural}}{{/message.f ulfillmentanswer}}." | FALSE | | |
| 5 | "Property Details/Rooms/ Bedroom/Room /Count" | "ok" | "According to my data{{{message.fulfillme nt.normalized_entities.Li sting.string}}} has {{{message.fulfillment.a nswer}}}{{{(value)}}} bedroom{{#is_plural}}s{ {/is_plural}}{{/message.f ulfillmentanswer}}." | FALSE | "{{"required_ entity_names" }:{""Listing""]" | ""required_entity_values"": {}" |

| | A | B | C | D | E | F | G |
|---|---|---|---|---|---|---|---|
| 1 | | Sent Prior | Observed | User 1 Got Response Prior | Observed | Showing Prior | Observed |
| 2 | Template | | | | | | |
| 3 | | | | | | | |
| 4 | | | | | | | 100 |
| 5 | 1 | | 25 | 2 | 3.75 | 2 | 0 |
| 6 | 2 | | 25 | 0 | 3.75 | 0 | 0 |
| 7 | 3 | | 25 | 1 | 3.75 | 1 | 1 |
| 8 | 4 | | 25 | 3 | 3.75 | 2 | 0 |
| 9 | 5 | | 25 | 0 | 3.75 | 0 | 0 |
| 10 | | | 0.25 | | 0.15 | | 0.05 |
| 11 | | | | | | | |
| 12 | Weighted Conversion per template | | | | | | |
| 13 | 1 | | | | 575 | | 100 |
| 14 | 2 | | | | 375 | | 100 |
| 15 | 3 | | | | 475 | | 500 |
| 16 | 4 | | | | 575 | | 100 |
| 17 | 5 | | | | 375 | | 100 |
| 18 | | | | | | | |
| 19 | | | | | | | |
| 20 | Weighted Impressions per template | | | | | | |
| 21 | 1 | | | | 2700 | | 10800 |
| 22 | 2 | | | | 2500 | | 10000 |
| 23 | 3 | | | | 2600 | | 10400 |
| 24 | 4 | | | | 2800 | | 11200 |
| 25 | 5 | | | | 2500 | | 10000 |

| | A | N | O | P | Q | R | S |
|---|---|---|---|---|---|---|---|
| 1 | | | | | | | |
| 2 | | | | All Users | | | |
| 3 | Template | ent Prior | Observed | Got Response Prior | Observed | 1 Showing Prior | Observed |
| 4 | | 1 | 2500 | 0.15 | | 0.01 | 1 |
| 5 | 1 | | 2500 | | 14386 | 375 | 862 | 25 | 146 |
| 6 | 2 | | 2500 | | 17606 | 375 | 1606 | 25 | 115 |
| 7 | 3 | | 2500 | | 35822 | 375 | 2224 | 25 | 9 |
| 8 | 4 | | 2500 | | 43456 | 375 | 4816 | 25 | 251 |
| 9 | 5 | | 2500 | | 36598 | 375 | 3360 | 25 | 38 |
| 10 | | | | | | | |
| 11 | Weighted Conversion per template | | | | | | |
| 12 | | | | | | | |
| 13 | 1 | | | | | | 696 |
| 14 | 2 | | | | | | 560 |
| 15 | 3 | | | | | | 136 |
| 16 | 4 | | | | | | 1104 |
| 17 | 5 | | | | | | 252 |
| 18 | | | | | | | |
| 19 | | | | | | | |
| 20 | Weighted Impressions per template | | | | | | |
| 21 | 1 | | | | | | 69344 |
| 22 | 2 | | | | | | 80424 |
| 23 | 3 | | | | | | 150388 |
| 24 | 4 | | | | | | 183800 |
| 25 | 5 | | | | | | 156394 |

(Weighted Conversion per template values, columns O/Q: 1237, 1901, 2599, 5191, 3735)
(Weighted Impressions per template values, columns O/Q: 17486, 20106, 37722, 45950, 39098)

| | A | B | C | D |
|---|---|---|---|---|
| 28 | | Total Weighted Conversion | Total Weighted Impressions | Weighted Conversion Rate |
| 29 | 1 | 8513 | 361980 | 0.024 |
| 30 | 2 | 4461 | 366130 | 0.012 |
| 31 | 3 | 9625 | 444360 | 0.022 |
| 32 | 4 | 9495 | 371600 | 0.026 |
| 33 | 5 | 6597 | 384790 | 0.017 |

MACHINE LEARNING OF RESPONSE SELECTION TO STRUCTURED DATA INPUT

CROSS-REFERENCE TO RELATED APPLICATION

This application is a continuation-in-part of U.S. patent application Ser. No. 15/826,151 is incorporated by reference in its entirety (referred to herein as the "'151 Application").

BACKGROUND OF THE INVENTION

Field of the Invention

The present invention relates to relates to supervised learning processing, and more particularly, to a system, method, and computer program product involving machine of response selection to structured data input.

Description of the Related Art

Supervised learning is a machine learning process that infers a function for determining an output based on training data, and the function is used to map new input data to an output. A natural language processor (NLP) represents one embodiment of a supervised learning processor. In general, a natural language processor (NLP) includes one or more NLP models to generate a prediction about and a response to a human-understandable, natural language (NL) statement. In at least one embodiment, the NL statement may be a statement, such as a query or command, and the NLP interprets the statement in order to provide a response.

Humans intuitively decide on how to respond to a conversational statement. For example, if a human is asked by an inquiring individual, "How large is the lot at 123 Pecan?" The human intuitively knows the context of the statement relates to the area of a parcel of real estate at a particular address. The human responder then provides an appropriate response. If the human knows the answer, the human responds to the inquirer with the answer. So, if the lot is ½ acre, strictly the answer to the question is "the lot is ½ acre." However, humans can intuitively enhance the response. For example, the human may know the history and specific details about the inquirer and provide a more insightful response that enhances the answer with information the human could anticipate that the inquirer would want to know or utilize semantics appropriate to the inquirer. For example, if the human knows the inquirer has children and would like a swimming pool, the human in addition to providing the size of the lot, the human may have insights into the inquirer and augment the answer with information with such insights, such as the presence or absence of a pool and state the particular schools nearby. Thus, in response to, "How large is the lot at 123 Pecan?" rather the human may respond, "The lot is rather large at ½ acre, has a pool, and the nearby schools are highly rated." Additionally, the human can intuitively gauge the acceptability to the inquirer of the response.

However, machines do not have the benefit of human intuition and cannot determine a proper response in the same way as a human. Furthermore, machine responses are often disadvantageously repetitive, 'mechanical,' and easily distinguishable from a human response. Additionally, the machine responses are not insightful.

SUMMARY OF THE INVENTION

In one embodiment, a method of machine learning in the selection of a ranked response to a structured data input having a natural language processing output schema received from a requesting device, the method, operating in an electronic, machine learning processing system, includes receiving the structured data input, wherein the structured data input includes filtering parameters for conversion into response template filtering criteria. The method further includes converting the filtering parameters into the response template filtering criteria and querying a library of response templates to identify candidate response templates that meet the response template filtering criteria to filter the response templates. The method further includes receiving a selection of the candidate response templates that meet the response template filtering criteria and respond to the structured input data, wherein the candidate response templates include static data and operating a ranking engine to rank the selection of candidate response templates in accordance with ranking criteria. The method further includes selecting a highest ranked candidate response template to provide a response to a device and deriving the response to the structured data input from the selected, highest ranked, candidate response template. The method also includes providing to the response to a recipient device and providing feedback to the ranking engine to refine the ranking criteria.

In another embodiment, an apparatus, for machine learning in the selection of a ranked response to a structured data input having a natural language processing output schema received from a requesting device, includes one or more data processors. The apparatus further includes a memory, coupled to the data processors, having code stored therein to cause the one or more data processors to receive the structured data input, wherein the structured data input includes filtering parameters for conversion into response template filtering criteria. The code further causes the one or more processors to convert the filtering parameters into the response template filtering criteria, query a library of response templates to identify candidate response templates that meet the response template filtering criteria to filter the response templates, and receive a selection of the candidate response templates that meet the response template filtering criteria and respond to the structured input data, wherein the candidate response templates include static data. The code further causes the one or more processors to operate a ranking engine to rank the selection of candidate response templates in accordance with ranking criteria, select a highest ranked candidate response template to provide a response to a device, and derive the response to the structured data input from the selected, highest ranked, candidate response template. The code further causes the one or more processors to provide to the response to a recipient device and provide feedback to the ranking engine to refine the ranking criteria.

In another embodiment, a non-transitory, computer program product includes code stored therein and executable by one or more processors to cause machine learning in the selection of a ranked response to a structured data input having a natural language processing output schema received from a requesting device, wherein the code is executable to cause the one or more data processors to receive the structured data input, wherein the structured data input includes filtering parameters for conversion into response template filtering criteria. The code further causes the one or more processors to convert the filtering parameters into the response template filtering criteria, query a library of response templates to identify candidate response templates that meet the response template filtering criteria to filter the response templates, and receive a selection of the candidate response templates that meet the response template filtering criteria and respond to the structured input data, wherein the candidate response templates include static data. The code further causes the one or more processors to operate a ranking engine to rank the selection of candidate response templates in accordance with ranking criteria, select a highest ranked candidate response template to provide a response to a device, and derive the response to the structured data input from the selected, highest ranked, candidate response template. The code further causes the one or more processors to provide to the response to a recipient device and provide feedback to the ranking engine to refine the ranking criteria.

In an additional, a method of receiving a response generated by machine learning in the selection of a ranked response to a structured data input having a natural language processing output schema received from a requesting device includes, in an electronic, machine learning processing system, receiving the response generated by:
- receiving the structured data input, wherein the structured data input includes filtering parameters for conversion into response template filtering criteria;
- converting the filtering parameters into the response template filtering criteria;
- querying a library of response templates to identify candidate response templates that meet the response template filtering criteria to filter the response templates;
- receiving a selection of the candidate response templates that meet the response template filtering criteria and respond to the structured input data, wherein the candidate response templates include static data;
- operating a ranking engine to rank the selection of candidate response templates in accordance with ranking criteria;
- selecting a highest ranked candidate response template to provide a response to a device; and
- deriving the response to the structured data input from the selected, highest ranked, candidate response template.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 4 and 5 depict structured data input.

FIGS. 7-8 depict selected response template candidates.

Figure 10:
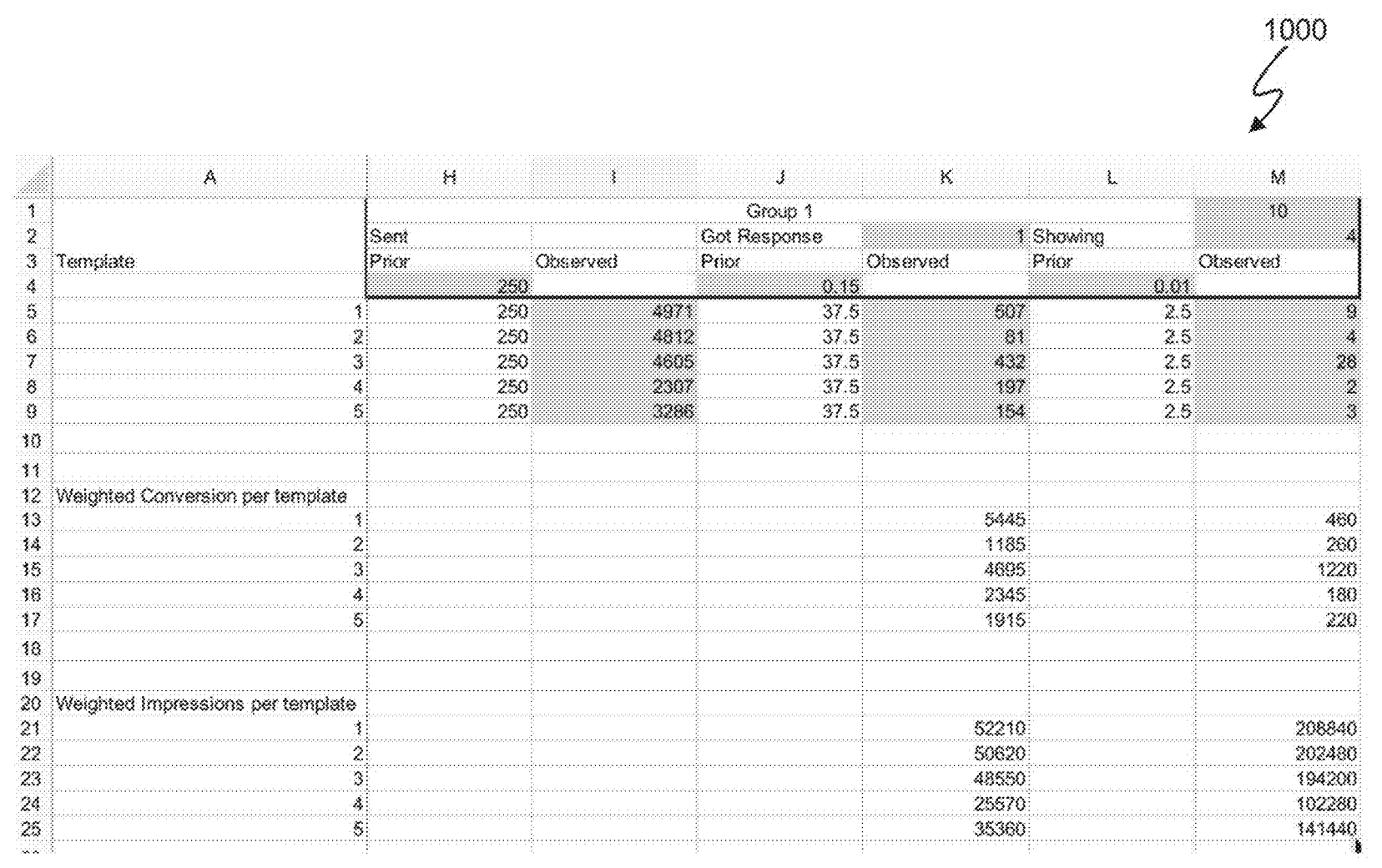

FIGS. 9-12 depict exemplary response template ranking parameters and results.

DETAILED DESCRIPTION

Figure 1:
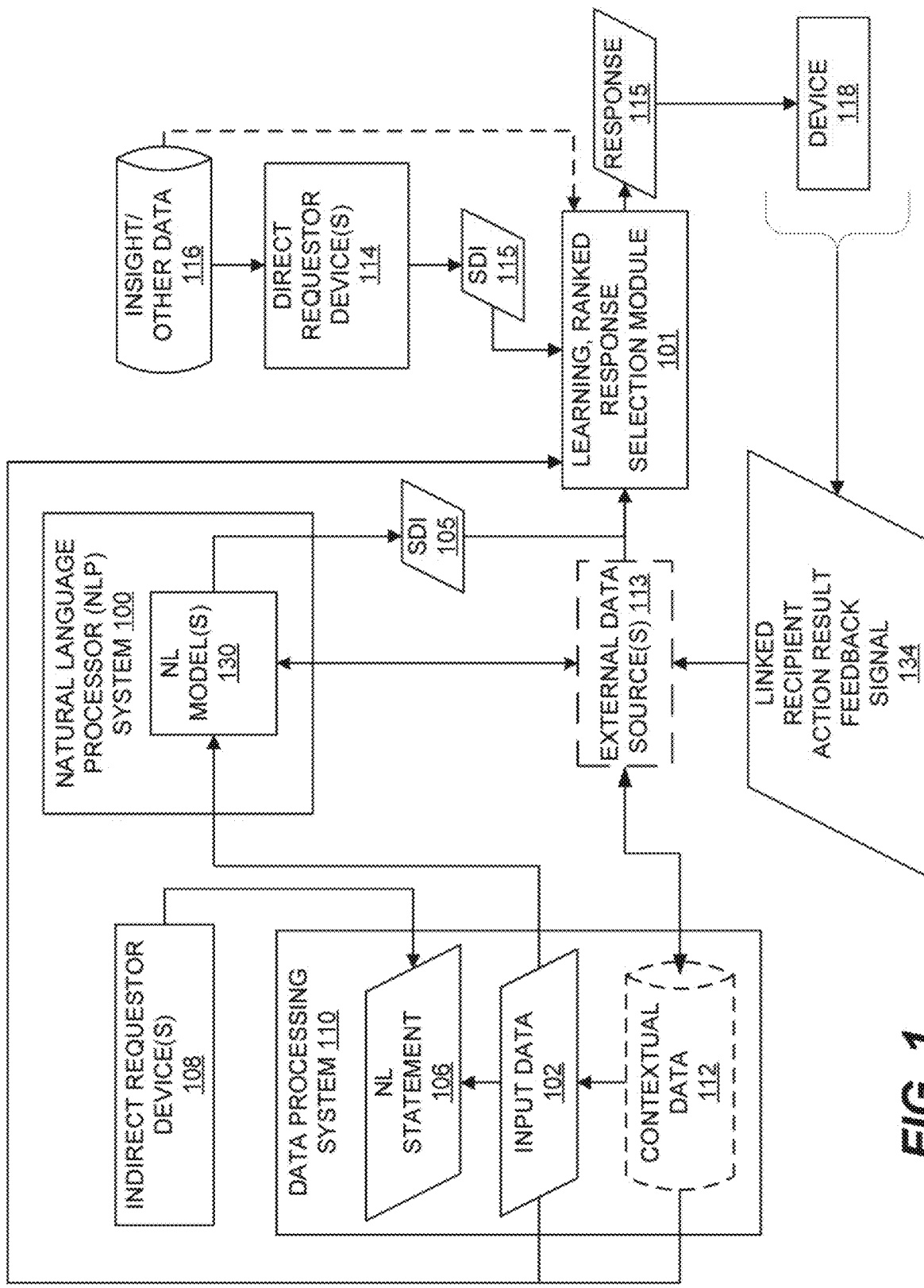
FIG. 1 depicts an exemplary machine learning system that includes a learning, ranked response selection module.

A machine learning of response selection to structured data input enables a machine to flexibly and responsively actively engage with a response recipient through a device, such as any electronic device connected to a data network. In at least one embodiment, the response selection module improves response selection to the structure data input by initially filtering a library of templates to identify candidate templates that best respond to the input. In at least one embodiment, the response selection module ranks the identified candidate templates to provide the response to the device. The response selection module learns by receiving feedback, such as a linked recipient action result signal. The linked recipient action result signal tracks activity of a recipient that is linked to receipt of a particular response. As a particular response becomes linked more frequently with activity that is considered a success, the probability of selecting the template from which the response was derived increases. To all the response selection module to continue learning, new response templates are introduced to the library of templates. In at least one embodiment, the response selection module selects the new response templates in accordance with a predetermined function to allow the response selection module to gauge success of the new response templates.

In at least one embodiment, the response selection module employs multiple mechanisms to provide ongoing improvement of and learning by the response selection module. Ranking the response templates allows the response selection module to continually learn which response to select and provide to recipients to maximize successful outcomes. Additionally, in at least one embodiment, the response selection module accesses additional data sources that can be processed to provide insights that may be helpful in better engaging the recipient and resulting in improved success rates. Furthermore, insights can yield proactive engagement with a past recipient. Additionally, successful insights can be incorporated into response templates for future use with other recipients. The same learning process then allows the response selection module to learn based on such new insights.

In at least one embodiment, the response selection module uses particular ranking criteria to improve learning by the response selection module of when and which response templates to select for particular recipients. In at least one embodiment, the ranking criteria determines a conversion rate of each candidate template that takes into account multiple factors that influence the ranking process. In at least one embodiment, the conversion rate is defined as recipient activities associated with a template relative to total impressions of the template. In at least one embodiment, the multiple factors that influence the conversion rate include weighting response templates based on (i) activities and measures of closeness that correlate the activity, the recipient, and the provided response and (ii) weighting particular activities where some activities are perceived as more valuable than others. For example, in the context of selling real estate, if the linked recipient action result feedback signal indicates the recipient sends a reply to a response, the response selection module weights the outcome of this activity. If the linked recipient action result feedback signal indicates the recipient schedules a showing of a house, the response selection module weights the outcome of this activity more heavily. Thus, the response selection module provides technical advantages by employing multiple learning mechanisms to enhance the response selection module to learn, modify responses, and improve performance over time to develop machine intuition.

FIG. 1 depicts an exemplary machine learning system 100 that includes a learning, ranked response selection module response selection module 101 that provides responses to structured data input. The response selection module 101 can be implemented as a special purpose hardware machine including as data processing system configured to execute instructions to implement the response selection module 101. The response selection module 101 receives structured data input, utilizes filtering criteria to select candidate response templates from a library of templates, ranks the candidate response templates in accordance with ranking criteria, and sends a response derived from the highest ranked response to device 118. The ranking criteria is adaptive to feedback, such as the linked recipient action result feedback signal 134 or feedback from a human that monitors the structured data input and selected candidate templates. In at least one embodiment, the ranking criteria adapts to the feedback by modifying parameter values of the ranking criteria that improve template selection and, thus, responses to structured data input.

In at least one embodiment, the response selection module 101 can receive structured data input from multiple sources and from multiple types of sources. In at least one embodiment, the structured data input has a natural language processing (NLP) output schema to allow the response selection module 101 to seamlessly interact with natural language processor systems, such as NLP system 100. In at least one embodiment, the NLP output schema refers to a schema utilized by a NLP system such as the schema used in the exemplary response prediction input data 500 (FIG. 5). In at least one embodiment, the NLP system 100 interacts with the data processing system 110 and receives a natural language statement submitted by an indirect requestor device(s) 108 as described as the "requestor device(s)" in the '151 Application. The device(s) 108 is referred to as an "indirect" requestor device in FIG. 1 because the response selection module 101 receives structured data input indirectly from the device(s) 108. The data processing system 110 utilizes the NL statement 106 and contextual data 112 to generate the input data 102 as, for example, described in the '151 Application. In at least one embodiment, contextual data 112 includes conversation state data and user profile data as described in the '151 Application. User profile data represents factual and behavioral information about the user. The NLP system 100 includes natural language (NL) model(s) 130 that generate the structured data input (SDI) 105 as described in the '151 Application. In this embodiment, the structured data input 105 is response prediction input data also as described in the '151 Application.

In at least one embodiment, the response selection module 101 also receives structured data input directly from the direct requestor device(s) 114. In at least one embodiment, the direct requestor device(s) 114 access the insight/other data 116, which includes information that may provide greater insight into users of the indirect requestor device(s) 108. For example, if the insight/other data indicates that one of the users has pets and has searched for houses with particular criteria, the direct requestor device 114 could generate structured data input 115 asking if there are houses that meet the criteria that are within a certain distance from a park and indicate that the response selection module 101 send the response to device 118, which in this instance represents the device 108. In at least one embodiment, the response selection module 101 selects a response in accordance with filter criteria derived from the structured data input 115 and informs the user of a house meeting the user's criteria and enhancing the response with the additional information about a nearby park.

The response selection module 101 can also obtain information from external data source(s) 113 that can include additional information that might be relevant to the user of device 118. In at least one embodiment, the response selection module 101 can utilize the additional information to derive filter criteria to select a response template that may have a higher chance of success in directing the user to a preferred activity.

The linked recipient action result feedback signal 134 represents data that correlates to an activity of a user of the device 118 that is linked to a response 115 provided to the device 118 by the response selection module 101. In at least one embodiment, an external data source(s) 113 receive the feedback signal 134, and, in at least one embodiment, the response selection module 101 receives and stores the feedback signal 134. The source (not shown) of the feedback signal 134 can be any device that can transmit data related to the user of device 118. For example, the source can be an electronic device of a sales person that has information that the user of device 118 performed an activity related to the response 115 and provides this information. The source can be an application that allows the user to communicate the feedback signal 134 directly, such as a direct reply to machine learning system 100 or other action that correlates the response 115 to an activity of the user within a window of time that allows the response selection module 101 to infer that the user's action was linked to the response 115.

The feedback signal 134 enables the response selection module 101 to learn and improve performance by correlating particular actions with a response 115. As subsequently described in more detail, when the response selection module 101 correlates the action and responses, in at least one embodiment, the response selection module 101 adjusts template selection ranking criteria accordingly. By adjusting the ranking criteria, the response selection module 101 can improve ranking and selection of response templates.

Figure 2:
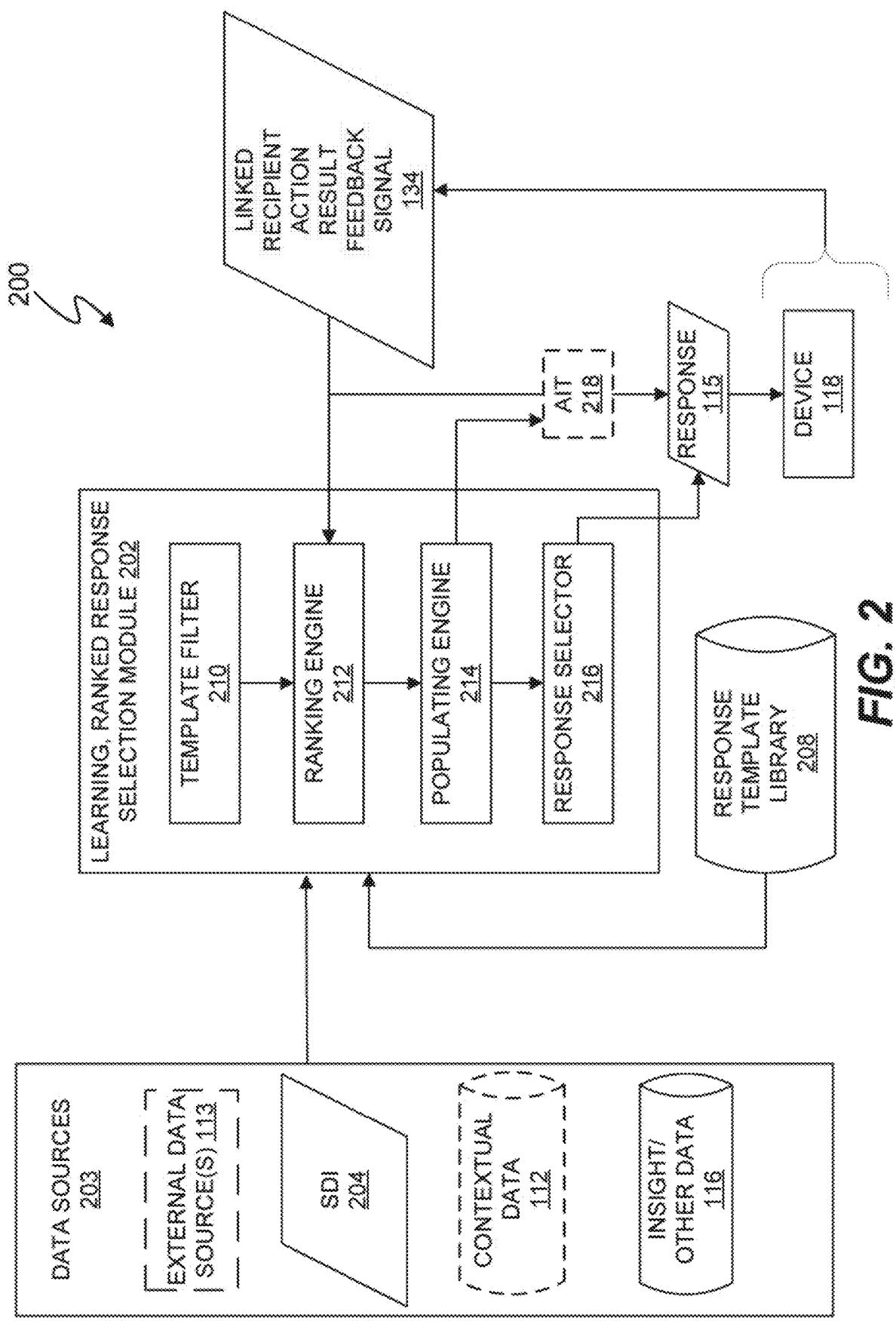
FIG. 2 depicts one embodiment of the machine learning system that includes a learning, ranked response selection module of FIG. 1.

FIG. 2 depicts an exemplary machine learning system 200 that includes learning, ranked response selection module 202, which represents one embodiment of the response selection module 101. As previously discussed in conjunction with the response selection module 101, the response selection module 202 utilizes the data from data sources 203 to select and rank response templates from response template library 208. The structured data input 204 represents structured data input from any source, such as NLP system 100 and device(s) 114.

Figure 3:
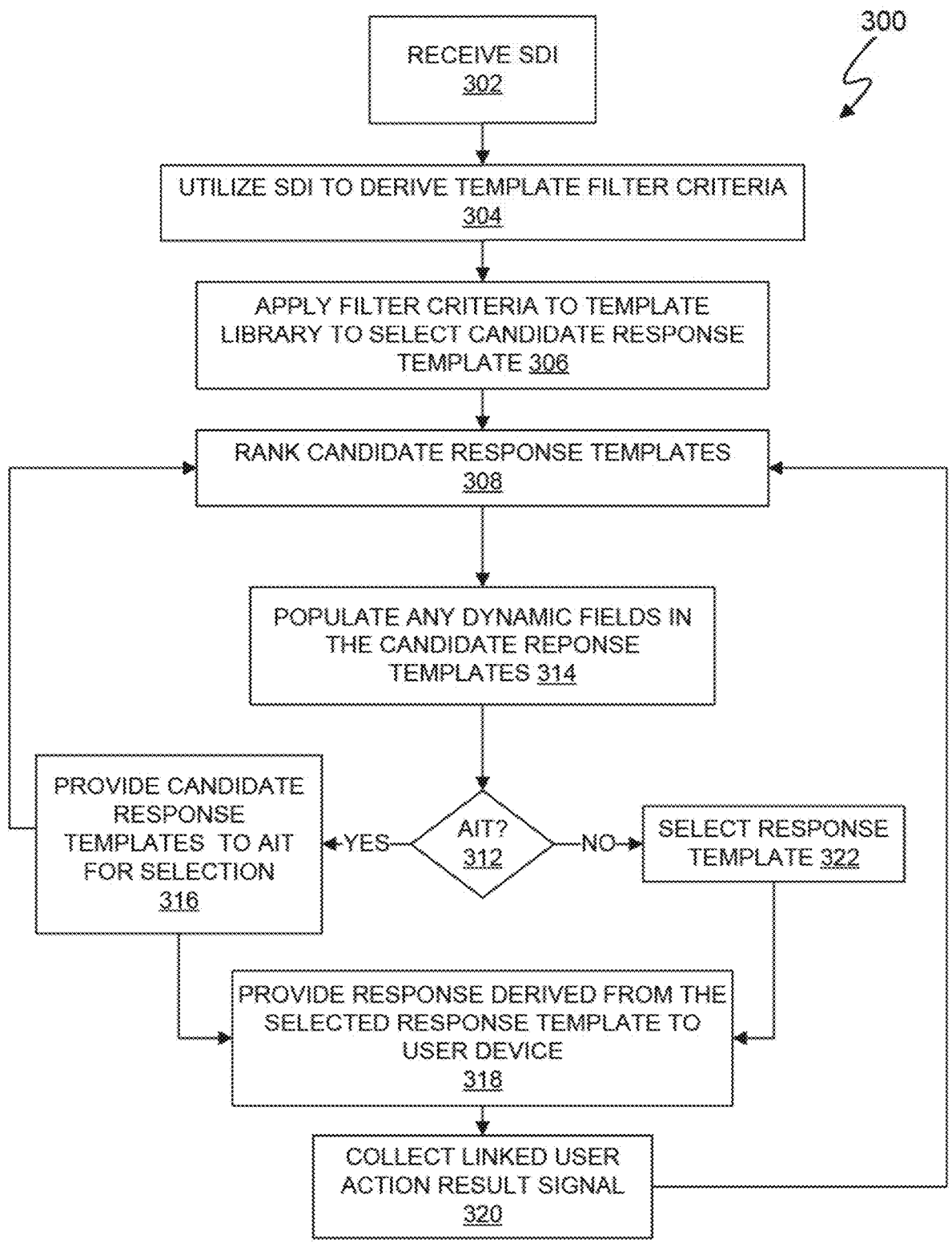
FIG. 3 depicts an exemplary response ranking and selection process.

FIG. 3 depicts an exemplary response ranking and selection process 300. In at least one embodiment, the machine learning system 200 operates in accordance with the process 300. Referring to FIGS. 2 and 3, in operation 302 the response selection module 202 receives the structured data input 204, which is constructed in accordance with a natural language processing output schema.

FIGS. 4 and 5 depict exemplary structured data input 400, which is the response prediction input data from the '151 Application. The structured data input 400 includes an incoming message 404 that asks, "How many bedrooms on the first floor?" The contextual data 406 is structured using a natural language processing output schema that includes various parameters such as intents path data 402, i.e. intents path=property details, rooms, bedrooms, room, count. Normalized entities 408 with entity names "listing" and "which," and associated entity values of "tx_actris_1234567" and "first floor," respectively.

Referring to FIGS. 2-5, operation 302 receives the structured data input 204. The structured data input 204 includes a statement to which the response selection module 202 selects one or more responses. The incoming message 404, "How many bedrooms on the first floor?" represents one example of a statement contained in the structured data input 204. Operation 304 derives template filter criteria utilizing the structured data input 204. The structured data input 204 has a structured natural language processing output schema that allows the response selection module 302 to identify specific parameters within the structured data input 204 from which the response selection module 202 formulates filtering criteria to identify candidate response templates from the response template library 208 that are responsive to the statement. To effectively function as filtering criteria, the response templates 208 include corresponding parameters and values that can be queried against to identify the candidate response templates.

Figure 6:
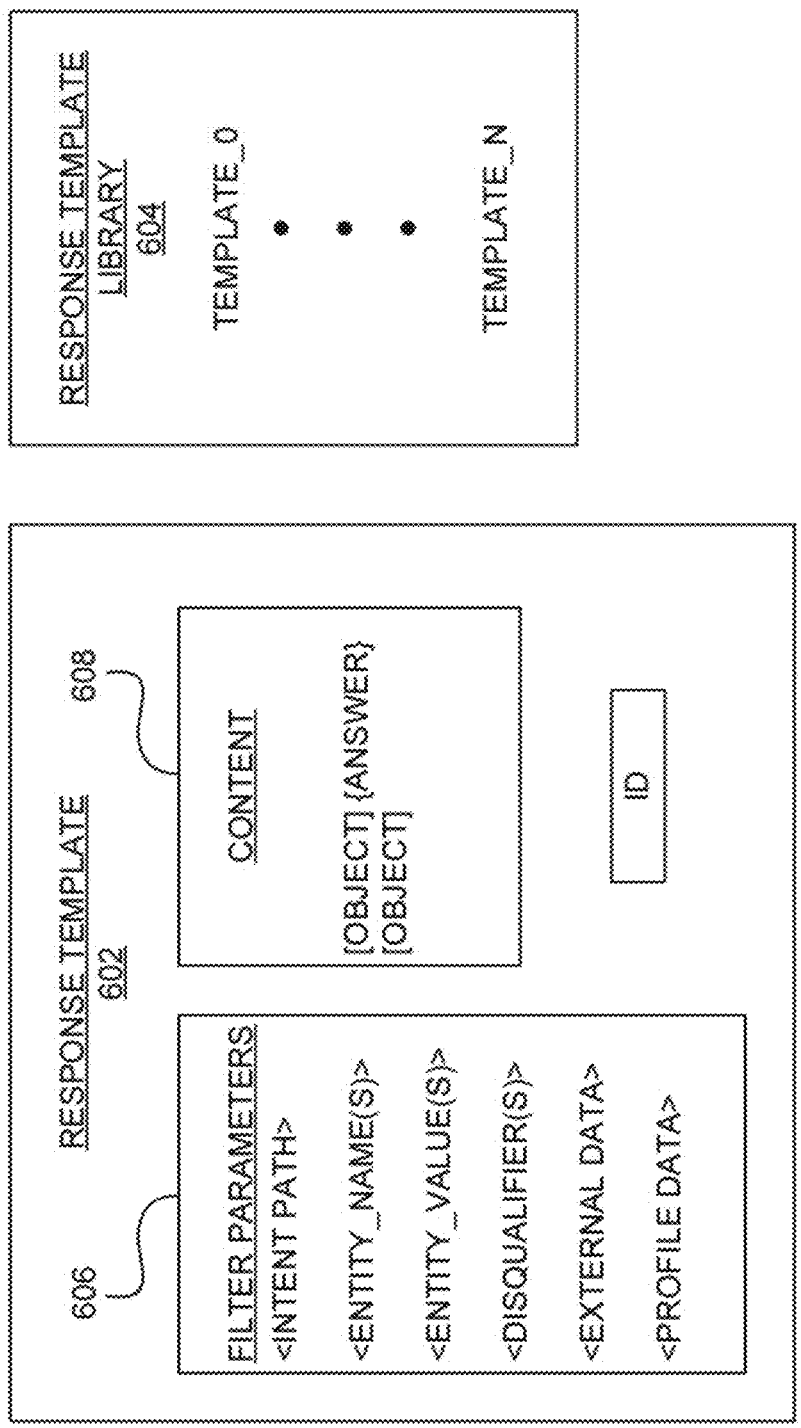
FIG. 6 depicts a response template data structure and response template library.

FIG. 6 depicts an exemplary response template data structure 602 and response template library 604. The response template 602 is a data structure that includes filter parameters 606. The depicted filter parameters 606 are illustrative and can be replaced with any filter parameters that allow the response selection module 202 to identify candidate response templates. The filter parameters 602 include <INTENT PATH>, <ENTITY_NAME(S)>, and <ENTITY_VALUES> that correspond directly to the same type of parameters in data 402 and 408 in the structured data input 204. The filter parameters 606 can include additional parameters and values that may not correspond to parameters in structured data input 204, such as user profile and group profile data in the contextual data 112, insight parameters in the insight/other data 116, and external data in external data source(s) 113. For example, the structured data input 204 may include specific contextual data about the requestor, such as the requestor's age, preferred commute time range, employment location, pets, children, desired spending range, and desired lot, house size, and number of bathrooms in a home buying context. The external data source(s) 113 can include additional information such as details about a home that can be accessed using a multiple listing service (MLS) number, map distances, school districts, school ratings, etc.

The insight/other data 116 can overlap with other data sources but can also include additional information that, for example, may be derived from data from other data sources. Such additional filter parameters are illustratively represented by the <EXTERNAL DATA> and <PROFILE DATA> filter parameters. Accordingly, the filter parameters 602 in the response template can be structured to be responsive to inquiries based on such additional parameters and values. The filter parameters 606 can also include disqualifying data that prevents a response template from being selected. An example disqualifier is if the dynamic content 608 includes mention of an object, such as a pool, and the response should not have such contact because, for example, inclusion of the object in the response 115 could be, for example, misleading.

The response template 602 also includes content data structure 608. The content represents that actual content that can be provided to a device 118. The content can include static and/or dynamic content fields. Dynamic content refers to content that the response selection module 202 populates with data, and the populated data can change depending on, for example, parameters of the structured data input 204. For example, the {ANSWER} field can represent dynamic content such as insertion of a particular address when responding to a real estate related statement. Each [OBJECT] can refer to, for example, static content, such as introductory or concluding phrases. Additionally, the content can include any type of content, such as text, photo, video, and hyperlinks. The response template 602 also includes an identifier (ID) to uniquely identify each response template.

The response template library 604 serves as a storage repository for the response templates N+1 number of response templates, where N is an integer. In at least one embodiment the response template library 604 is stored in a database and is accessible using database queries, such as structured query language (SQL) queries.

Referring to FIGS. 2-6, in at least one embodiment, the response selection module 202 includes a template filter 210 that performs operation 304 to derive the template filter criteria by formulating a query to the response template library 604 to identify response templates having specific parameters and values contained in the structured data input 204. For example, operation 304 utilizes the intent path data 402 of intents path: "property details, rooms, bedrooms, room, count" and the presence of a "listing" entity name to formulate a filter criteria query of select intent_path templates where intent_path=' property details, rooms, bedrooms, room, count" and required entity_names="listing." Operation 306 applies the filter criteria to the template library 604 to identify and select response templates that meet the filter criteria.

FIGS. 7-8 depict selected candidate response templates having ID's 1-5. Each of the candidate response templates meets the filter criteria for 'property details, rooms, bedrooms, room, count" and required entity_names="listing. In at least one embodiment, the candidate response templates have additional qualifiers such as a status code of "ok," which indicates the response templates are available for use and a qualifier that response templates are not for multi-answers. Each candidate response template 1-5 also indicates that specific entity_values are not required to select the response template. Each response template includes static and dynamic content. For example, response template id=1, has content of ""The home at {{{message.fulfillment.normalized_entities.Listing.string}}} has {{#message.fulfillment.answer}}{{{value}}} bedroom{{#is_plural}}s{{/is_plural}}{{/message.fulfillment.answer}}." The bracketed fields enable entry of dynamic content that is populated with values from the data sources 203. For example, from structured data input 400, the content in template 1 is "The home at 61204 Mesa has 3 bedrooms," the content in template 2 is "There are 3 bedrooms in the home at 61204 Mesa." The content can also include dynamic insights if available that are populated from data sources 203, such as "The home at 61204 Mesa has 3 bedrooms and a pool," if an insight into the requestor indicates the requestor was previously interested in properties with a pool.

A ranking engine 212 performs operation 308 and ranks the candidate response templates using ranking criteria. By ranking the candidate templates, the ranking engine 212 allows the response selection module 202 to select the candidate response template with an estimated highest chance of causing the recipient to engage in an activity considered successful, such as replying to the response or taking certain action, like scheduling a showing of a home for purchase. The particular ranking criteria is a matter of design choice. Exemplary ranking criteria is set forth below:

for each candidate response template, determining the conversion rate in accordance with equation [1]:

$$\text{Conversion Rate} = \frac{\text{Success Count}}{\text{Attempt Count}} \quad [1]$$

$$\text{Success Count} = \sum_a (SC_{User} + SC_{Group} + SC_{All})$$

$$\text{Attempt Count} = \sum_a (I_{User} + I_{Group} + I_{All})$$

$$SC_{User} = w_a w_U \|\text{conversions}_{\tilde{s}, U}(\emptyset)\|$$

$$SC_{Group} = w_a w_G \sum_{k \in x} \|\text{conversions}_{\tilde{s}, k}(\emptyset)\|$$

$$SC_{All} = w_a w_A \|\text{conversions}_{\tilde{s}, A}(\emptyset)\|$$

$$\text{Attempt Count} = \sum_a (I_{User} + I_{Group} + I_{All})$$

$$I_{User} = w_a w_U \|\text{impressions}_{\tilde{s}, U}(\emptyset)\|$$

$$I_{Group} = w_a w_G \sum_{k \in x} \|\text{impressions}_{\tilde{s}, k}(\emptyset)\|$$

$$I_{All} = w_a w_A \|\text{impressions}_{\tilde{s}, A}(\emptyset)\|$$

wherein:

$w_a$ is an activity weight;

$w_U$ is a user weight of a user U associated with the structured data input, $w_G$ is a group weight of a group G that includes the user and is a subset of all users of the supervised learning processing system, and $w_A$ is a weight for all users A of the supervised learning processing system;

conversion is a conversion associated with the response template for an activity a by a user the user U, the group G, or all users A; and impression is an impression associated with the response template for an activity a by a user the user U, the group G, or all users A.

In summary, the foregoing ranking criteria determines a conversion rate that is based on conversions and impressions by a user, a group with similar attributes as the user, and all users. Successes for the user are more indicative of future success than successes by the group and all users, and successes for the group are more indicative of future success than successes by the all users. Furthermore, different activities are considered more valuable than others as previously described. By determining the weighted conversions and activities relative to the total number of impressions, the ranking engine 212 determines a conversion rate that provides a measure of performance for each candidate response template. The ranking engine 212 revises the number of impressions and from feedback signal 134 adjusts the conversion data. Furthermore, the weights can be adjusted to further enhance the learning of the ranking engine 212.

In at least one embodiment, the conversion rate is a function of the success values and the attempt values, i.e. conversion rate=f(success, attempt), and not strictly (success/attempt). For example, the conversion rate function can incorporate distributions, such as beta distributions parameterized by success and attempt values, of conversion rates and ranking of the candidate response template can be based on a random sampling of the conversion rate values in the distribution. Utilizing this 'distribution' based conversion rate function allows a probability of assigning a higher conversion rate based ranking to candidate response templates that do not have the strictly highest (success/attempt) value. In at least one embodiment, the particular distributions are mathematically shaped to provide a probably frequency of ranking a particular candidate response template with the highest conversion rate. By allowing the ranking engine 212 to distribute the highest conversion rate ranking among candidate response templates, the response selection module 202 learns the effectiveness of different response templates. Additionally, the response selection module 202 can insert new response templates into the collection of candidate response templates to allow the response selection module 202 to learn about the success of the experimental response templates. When adding new response templates that do not have observed conversion and impression values, the conversion rate function can be modified to ensure any number of highest conversion rate values for each candidate response template by, for example, inserting an override factor that forces a high conversion rate of the new candidate response template. The override factor can be, for example, a weight selected from a distribution of weights or a random number that ensures selection of the new candidate response template at some probabilistic frequency. In at least one embodiment, the override factor is determined by an epsilon-greedy function that forces occasional highest ranking and selection of the new candidate response template.

FIGS. 9-12 depict exemplary response template ranking parameters and results. Cells G1, M1, and S1 are values of respective weights $w_U$, $w_G$, and $w_A$. Each weight from the user to group to all is an order of magnitude larger, which represents the relative importance of the conversion feedback. Cells E2, K2, and Q2 represent weight $w_a=1$ for a user activity of "Got Response," which is receiving a reply to the response derived from the particular response template. Cells G2, M2, and S2 represent weight $w_a=4$ for a user activity of "Showing" of a property because showing is more valuable than receiving a response. The ranking results include "Prior" and "Observed" results. "Prior" is inserted as a value that represents estimated performance to initialize the ranking data so that the conversion rates are more meaningful. "Prior" and "Observed" values are added together for purposes of values in Equation [1]. The weighted conversions, weighted impressions, and overall conversion rates are computed in accordance with Equation [1].

The response selection module 202 includes a populating engine 214 that in operation 314 populates any dynamic fields in the candidate response templates and converts the populated content into a response message ready for sending. Population can occur before or after selection of the response template. Operation 312 determines whether the response selection module 202 provides the ranked candidate templates to a human artificial intelligence technician (AIT) 218 to allow the AIT 218 to select the response to send to device 118 or allow the response selector 216 to directly select and send the response to the device 118. The function to determine the outcome of operation 312 is a matter of design choice. In at least one embodiment, the function of operation 312 relies on a confidence level assigned to the response selection module 202 for specific structured data input and responses. If operation 312 selects the AIT 218, the response selection module 202 provides the candidate response templates to the AIT 218 with ranking information for selection. Operation 318 provides a response derived from the selected response template to the device 118. In at least one embodiment, the derived response is the populated content from the selected response template. The selection made by the AIT 218 is fed back to the ranking engine 212 to allow the ranking engine to revise the impression counts for the selected response template and to correlate any feedback signal 134 to the selected response template. If operation 312 does not select the AIT 218 to select the template and send the response, in operation 322 the response selector 216 selects the response template in accordance with selection criteria and provides the response template content to the device 118. The selection criteria is a matter of design choice. In at least one embodiment, the selection criteria selects the template with the highest conversion rate. However, such criteria can quickly eliminate candidate templates from future selection. So, other selection criteria utilizes a distribution of the conversion rates of the candidate templates to proportionately select candidate templates in accordance with their conversion rates. Additionally, the selection criteria can use an override to select new candidate templates or to force selection of particular candidate templates. Thus, the response selection module 202 is able to continue learning which candidate template is best on a user, group, and all users basis.

Figure 13:
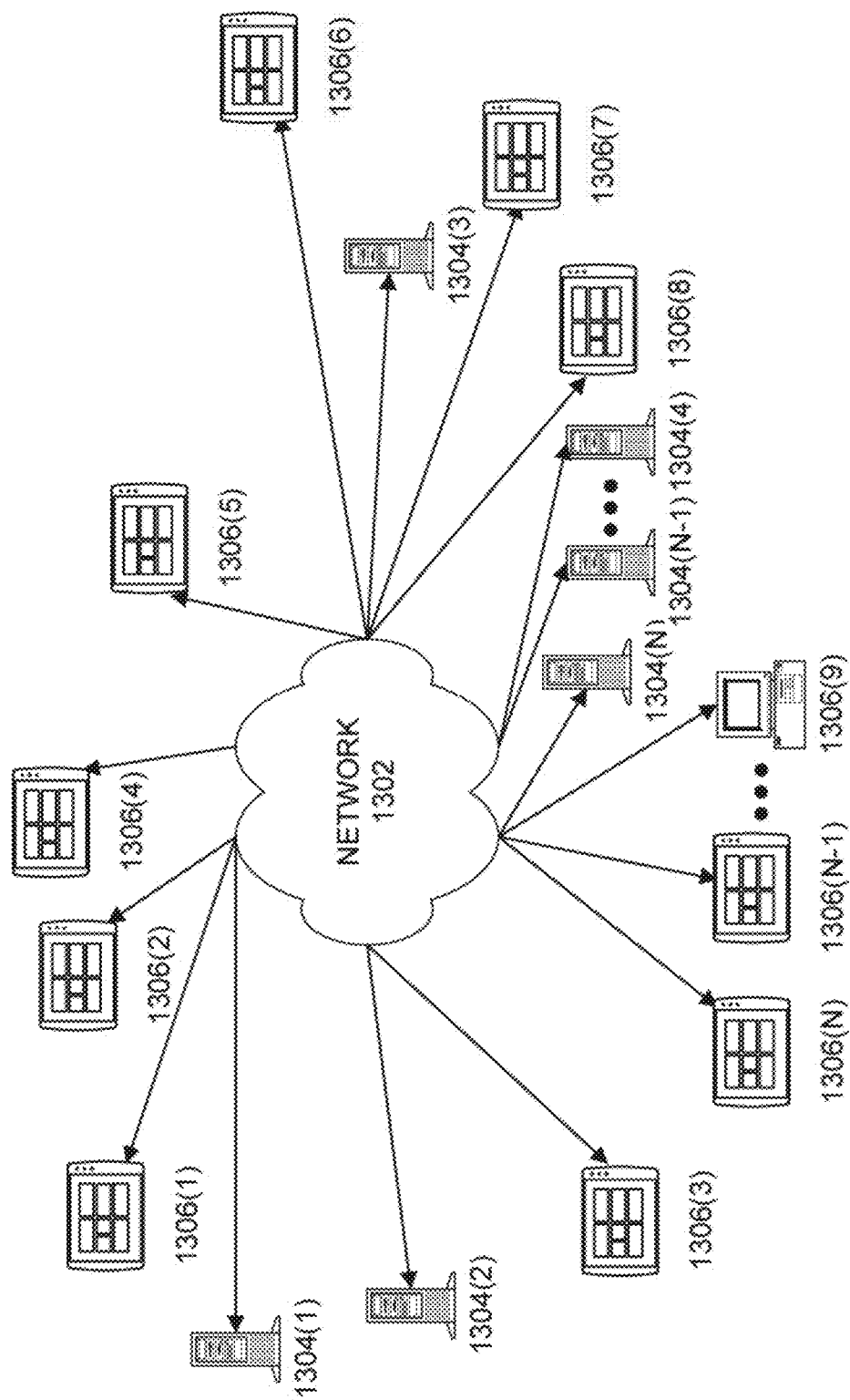
FIG. 13 depicts an exemplary computer system.

FIG. 13 is a block diagram illustrating an exemplary network environment in which the machine learning system that includes a learning, ranked response selection module response selection module may be practiced. Network 1302 (e.g. a private wide area network (WAN) or the Internet)

includes a number of networked computer systems 1304(1)-(N) that can each implement a specialized machine learning system and the learning, ranked response selection module response selection module. Communication between user requestor devices 1306(1)-(N) and each specialized machine learning system and the learning, ranked response selection module response selection module 1304(1)-(N) typically occurs over a network, such as a public switched telephone network or cable network of asynchronous digital subscriber line (ADSL) channels or high-bandwidth trunks, for example communications channels providing T1 or OC3 service. Requestor devices 1306(1)-(N) typically access server computer systems 1304(1)-(N) through a service provider, such as an internet service provider ("ISP") by executing application specific software, commonly referred to as a browser, on one of requestor devices 1306(1)-(N).

Requestor device 1306(1)-(N) and/or specialized machine learning systems and the learning, ranked response selection module response selection modules 1304(1)-(N) may include, for example, computer systems of any appropriate design, including a mainframe, a mini-computer, a personal computer system including notebook computers, a wireless, mobile computing device (including personal digital assistants, smart phones, and tablet computers). These computer systems are typically information handling systems, which are designed to provide computing power to one or more users, either locally or remotely. Such a computer system may also include one or a plurality of input/output ("I/O") devices coupled to the system processor to perform specialized functions. Tangible, non-transitory memories (also referred to as "storage devices") such as hard disks, compact disk ("CD") drives, digital versatile disk ("DVD") drives, and magneto-optical drives may also be provided, either as an integrated or peripheral device. In at least one embodiment, the machine learning system and the learning, ranked response selection module response selection module can be implemented using code stored in a tangible, non-transient computer readable medium and executed by one or more processors. In at least one embodiment, the machine learning system and the learning, ranked response selection module response selection module can be implemented completely in hardware using, for example, logic circuits and other circuits including field programmable gate arrays.

Figure 14:
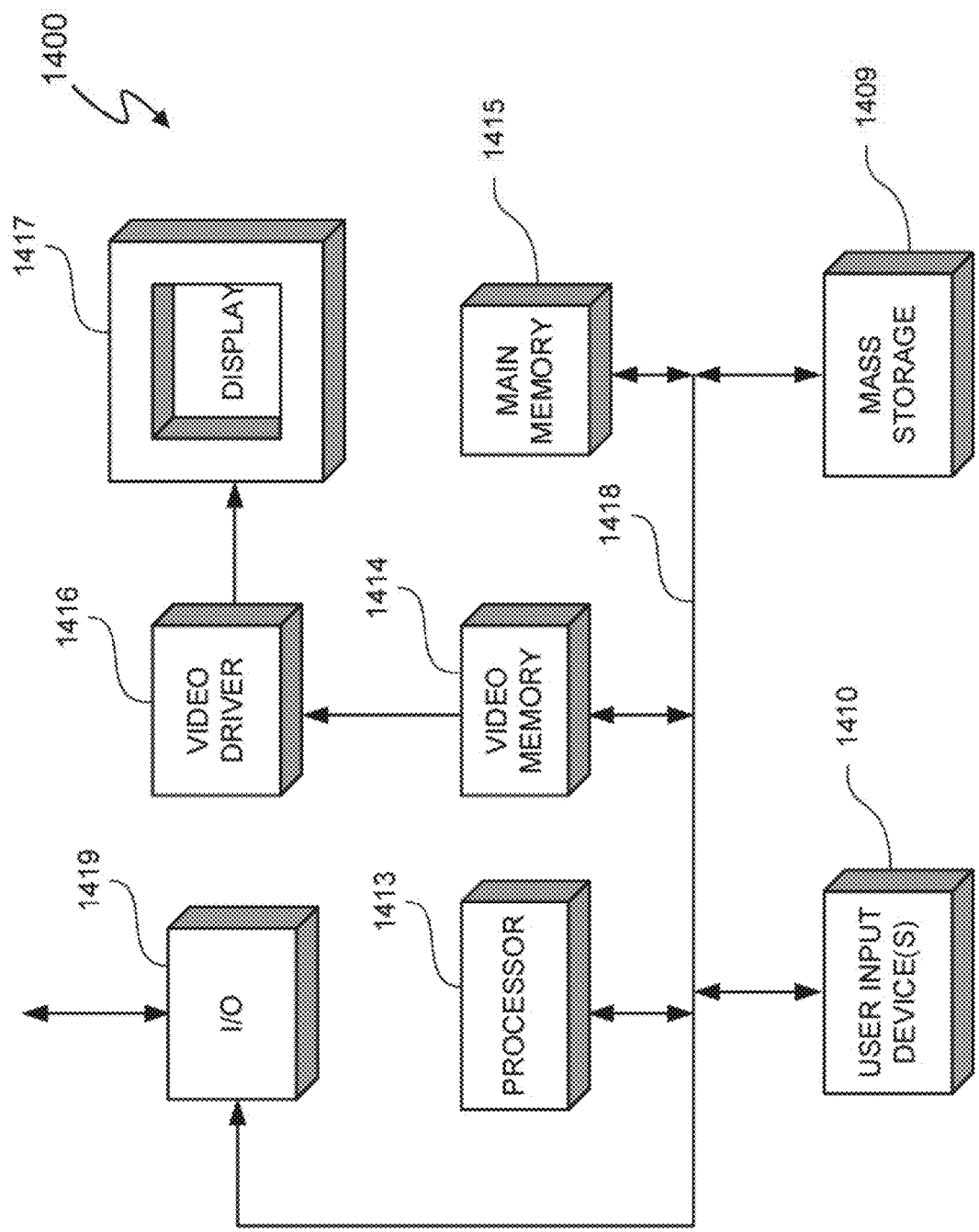
FIG. 14 depicts embodiments of a computer implemented natural language processing system.

Embodiments of individual machine learning systems 1304(1)-(N) can be implemented on a computer system such as computer 1400 illustrated in FIG. 14. The computer 1400 can be a dedicated computer system or a virtual, emulated system located in, for example, a cloud computing environment. Input user device(s) 1410, such as a keyboard and/or mouse, are coupled to a bi-directional system bus 1418. The input user device(s) 1410 are for introducing user input to the computer system and communicating that user input to processor 1413. The computer system of FIG. 14 generally also includes a non-transitory video memory 1414, non-transitory main memory 1415, and non-transitory mass storage 1409, all coupled to bi-directional system bus 1418 along with input user device(s) 1410 and processor 1413. The mass storage 1409 may include both fixed and removable media, such as a hard drive, one or more CDs or DVDs, solid state memory including flash memory, and other available mass storage technology. Bus 1418 may contain, for example, 32 of 64 address lines for addressing video memory 1414 or main memory 1415. The system bus 1418 also includes, for example, an n-bit data bus for transferring DATA between and among the components, such as CPU 1409, main memory 1415, video memory 1414 and mass storage 1409, where "n" is, for example, 32 or 64. Alternatively, multiplex data/address lines may be used instead of separate data and address lines.

I/O device(s) 1419 may provide connections to peripheral devices, such as a printer, and may also provide a direct connection to remote server computer systems via a telephone link or to the Internet via an ISP. I/O device(s) 1419 may also include a network interface device to provide a direct connection to remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in a non-transient computer readable medium such as a flash memory, optical memory, magnetic memory, compact disks, digital versatile disks, and any other type of memory. The computer program is loaded from a memory, such as mass storage 1409, into main memory 1415 for execution. Computer programs may also be in the form of electronic signals modulated in accordance with the computer program and data communication technology when transferred via a network. In at least one embodiment, Java applets or any other technology is used with web pages to allow a user of a web browser to make and submit selections and allow a client computer system to capture the user selection and submit the selection data to a server computer system.

The processor 1413, in one embodiment, is a microprocessor manufactured by Motorola Inc. of Illinois, Intel Corporation of California, or Advanced Micro Devices of California. However, any other suitable single or multiple microprocessors or microcomputers may be utilized. Main memory 1415 is comprised of dynamic random access memory (DRAM). Video memory 1414 is a dual-ported video random access memory. One port of the video memory 1414 is coupled to video amplifier 1416. The video amplifier 1416 is used to drive the display 1417. Video amplifier 1416 is well known in the art and may be implemented by any suitable means. This circuitry converts pixel DATA stored in video memory 1414 to a raster signal suitable for use by display 1417. Display 1417 is a type of monitor suitable for displaying graphic images. The computer system described above is for purposes of example only.

Although embodiments have been described in detail, it should be understood that various changes, substitutions, and alterations can be made hereto without departing from the spirit and scope of the invention as defined by the appended claims.

What is claimed is:

1. A method of machine learning in the selection of a ranked response to a structured data input having a natural language processing output schema received from a requesting device, the method comprising:
   in an electronic, machine learning processing system:
   receiving the structured data input, wherein the structured data input includes filter parameters for conversion into response template filter criteria;
   converting the filter parameters into the response template filter criteria;
   querying a library of response templates to identify candidate response templates that meet the response template filter criteria to filter the response templates;

receiving a selection of the candidate response templates that meet the response template filter criteria and respond to the structured input data, wherein the candidate response templates include static data;

operating a ranking engine to rank the selection of candidate response templates in accordance with ranking criteria;

selecting a highest ranked candidate response template to provide a response to a device;

deriving the response to the structured data input from the selected, highest ranked, candidate response template;

providing the response to a recipient device; and providing feedback to the ranking engine to refine the ranking criteria.

2. The method of claim 1 wherein the requesting device accesses data that provides insight into an individual and formulates the structured data input as a proactive query to obtain a proactive response to provide to the recipient device that is germane to the individual based on the insight.

3. The method of claim 1 wherein the requesting device comprises a natural language processor that processes a natural language statement to generate natural language output data, wherein the structured data input comprises the natural language output data.

4. The method of claim 1 wherein the filter parameters comprise an intent path, entity names, and entity values derived from a natural language statement and structured in accordance with the natural language processed output schema.

5. The method of claim 1 wherein at least a proper subset of the response templates include one or more dynamic fields, the method further comprising:

populating the one or more dynamic data fields of at least one of the candidate response templates with data obtained from the structured data input.

6. The method of claim 1 further comprising:

accessing profiles of one or more users to obtain augmenting data that augments intent data of the structured data input, wherein each of the profiles about a user includes data representing factual and behavioral information about the user; and augmenting response templates with the augmenting data.

7. The method of claim 1 wherein the ranking criteria comprises a function that determines a conversion rate of each of the candidate response templates that is based on conversions and impressions by a user of the machine learning processing system, a group with similar attributes as the user, and all users of the machine learning processing system.

8. The method of claim 7 wherein the function of the conversion rate incorporates distributions of conversion rates and ranking of the candidate response template is based on a random sampling of the conversion rate values in the distribution.

9. The method of claim 8 wherein the distributions include beta distributions parameterized by success values associated with candidate response templates and attempt values associated with candidate response templates.

10. The method of claim 1 wherein the ranking criteria comprises a function of a conversion rate of each of the candidate response templates that distributes the highest conversion rate ranking among candidate response templates to allow the machine to learn about each of the candidate response templates.

11. The method of claim 10 further comprising:

for each candidate response template, determining the conversion rate in accordance with equation [1]:

$$\text{Conversion Rate} = \frac{\text{Success Count}}{\text{Attempt Count}} \quad [1]$$

$$\text{Success Count} = \sum_a (SC_{User} + SC_{Group} + SC_{All})$$

$$\text{Attempt Count} = \sum_a (I_{User} + I_{Group} + I_{All})$$

$$SC_{User} = w_a w_U \|\text{conversions}_{a,U}(\phi)\|$$

$$SC_{Group} = w_a w_G \sum_{k \in x} \|\text{conversions}_{a,k}(\phi)\|$$

$$SC_{All} = w_a w_A \|\text{conversions}_{a,A}(\phi)\|$$

$$\text{Attempt Count} = \sum_a (I_{User} + I_{Group} + I_{All})$$

$$I_{User} = w_a w_U \|\text{impressions}_{a,U}(\phi)\|$$

$$I_{Group} = w_a w_G \sum_{k \in x} \|\text{impressions}_{a,k}(\phi)\|$$

$$I_{All} = w_a w_A \|\text{impressions}_{a,A}(\phi)\|$$

wherein:

$w_a$ is an activity weight;

$w_U$ is a user weight of a user U associated with the structured data input, $w_G$ is a group weight of a group G that includes the user and is a subset of all users of the supervised learning processing system, and $w_A$ is a weight for all users A of the supervised learning processing system;

conversion is a conversion associated with the response template for an activity a by a user the user U, the group G, or all users A; and impression is an impression associated with the response template for an activity a by a user the user U, the group G, or all users A.

12. The method of claim 1 wherein deriving the response further comprises:

populating any dynamic fields in the selected, highest ranked, candidate response template with content; and converting the selected, highest ranked, candidate response template with populated content into the response.

13. An apparatus for machine learning in the selection of a ranked response to a structured data input having a natural language processing output schema received from a requesting device, the apparatus comprising:

one or more data processors;

a memory, coupled to the data processors, having code stored therein to cause the one or more data processors to:

receive the structured data input, wherein the structured data input includes filter parameters for conversion into response template filter criteria;

convert the filter parameters into the response template filter criteria;

query a library of response templates to identify candidate response templates that meet the response template filter criteria to filter the response templates;

receive a selection of the candidate response templates that meet the response template filter criteria and respond to the structured input data, wherein the candidate response templates include static data;

operate a ranking engine to rank the selection of candidate response templates in accordance with ranking criteria;

select a highest ranked candidate response template to provide a response to a device;

derive the response to the structured data input from the selected, highest ranked, candidate response template;

provide the response to a recipient device; and provide feedback to the ranking engine to refine the ranking criteria.

14. The apparatus of claim 13 wherein the requesting device accesses data that provides insight into an individual and formulates the structured data input as a proactive query to obtain a proactive response to provide to the recipient device that is germane to the individual based on the insight.

15. The apparatus of claim 13 wherein the requesting device comprises a natural language processor that processes a natural language statement to generate natural language output data, wherein the structured data input comprises the natural language output data.

16. The apparatus of claim 13 wherein the filter parameters comprise an intent path, entity names, and entity values derived from a natural language statement and structured in accordance with the natural language processed output schema.

17. The apparatus of claim 13 wherein at least a proper subset of the response templates include one or more dynamic fields, and the code further causes the one or more data processors to:

populate the one or more dynamic data fields of at least one of the candidate response templates with data obtained from the structured data input.

18. The apparatus of claim 13 wherein the code further causes the one or more data processors to:

access profiles of one or more users to obtain augmenting data that augments intent data of the structured data input, wherein each of the profiles about a user includes data representing factual and behavioral information about the user; and augment response templates with the augmenting data.

19. The apparatus of claim 13 wherein the ranking criteria comprises a function of a conversion rate of each of the candidate response templates that distributes the highest conversion rate ranking among candidate response templates to allow the machine to learn about each of the candidate response templates.

20. The apparatus of claim 19 further comprising:

for each candidate response template, determining the conversion rate in accordance with equation [1]:

$$\text{Conversion Rate} = \frac{\text{Success Count}}{\text{Attempt Count}} \quad [1]$$

$$\text{Success Count} = \sum_a (SC_{User} + SC_{Group} + SC_{All})$$

$$\text{Attempt Count} = \sum_a (I_{User} + I_{Group} + I_{All})$$

$$SC_{User} = w_a w_U \|\text{conversions}_{a,U}(\emptyset)\|$$

$$SC_{Group} = w_a w_G \sum_{k \in x} \|\text{conversions}_{a,k}(\emptyset)\|$$

$$SC_{All} = w_a w_A \|\text{conversions}_{a,A}(\emptyset)\|$$

$$\text{Attempt Count} = \sum_a (I_{User} + I_{Group} + I_{All})$$

$$I_{User} = w_a w_U \|\text{impressions}_{a,U}(\emptyset)\|$$

$$I_{Group} = w_a w_G \sum_{k \in x} \|\text{impressions}_{a,k}(\emptyset)\|$$

$$I_{All} = w_a w_A \|\text{impressions}_{a,A}(\emptyset)\|$$

wherein:

$w_a$ is an activity weight;

$w_U$ is a user weight of a user U associated with the structured data input, $w_G$ is a group weight of a group G that includes the user and is a subset of all users of the supervised learning processing system, and $w_A$ is a weight for all users A of the supervised learning processing system;

conversion is a conversion associated with the response template for an activity a by a user the user U, the group G, or all users A; and impression is an impression associated with the response template for an activity a by a user the user U, the group G, or all users A.

21. The apparatus of claim 13 wherein the ranking criteria comprises a function that determines a conversion rate of each of the candidate response templates that is based on conversions and impressions by a user of the machine learning processing system, a group with similar attributes as the user, and all users of the machine learning processing system.

22. The apparatus of claim 21 wherein the function of the conversion rate incorporates distributions of conversion rates and ranking of the candidate response template is based on a random sampling of the conversion rate values in the distribution.

23. The apparatus of claim 22 wherein the distributions include beta distributions parameterized by success values associated with candidate response templates and attempt values associated with candidate response templates.

24. The apparatus of claim 13 wherein to derive the response further comprises to:

populate any dynamic fields in the selected, highest ranked, candidate response template with content; and convert the selected, highest ranked, candidate response template with populated content into the response.

* * * * *